(12) United States Patent
Lindälv et al.

(10) Patent No.: US 9,270,020 B2
(45) Date of Patent: Feb. 23, 2016

(54) ANTENNA ARRANGEMENT FOR A RADAR SYSTEM

(75) Inventors: Erik Lindälv, Landvetter (SE); Jan-Erik Nilsson, Varberg (SE)

(73) Assignee: SAAB AB, Linkoeping (SE)

( * ) Notice: Subject to any disclaimer, the term of this patent is extended or adjusted under 35 U.S.C. 154(b) by 303 days.

(21) Appl. No.: 13/990,612

(22) PCT Filed: Dec. 22, 2010

(86) PCT No.: PCT/SE2010/051462
§ 371 (c)(1),
(2), (4) Date: Jun. 17, 2013

(87) PCT Pub. No.: WO2012/087208
PCT Pub. Date: Jun. 28, 2012

(65) Prior Publication Data
US 2014/0168003 A1    Jun. 19, 2014

(51) Int. Cl.
*G01S 13/58* (2006.01)
*H01Q 3/00* (2006.01)
*G01S 13/42* (2006.01)
(Continued)

(52) U.S. Cl.
CPC *H01Q 3/00* (2013.01); *G01S 13/42* (2013.01); *G01S 13/48* (2013.01); *G01S 13/58* (2013.01); *H01Q 21/062* (2013.01)

(58) Field of Classification Search
CPC ......... G01S 13/42; G01S 13/48; G01S 13/58; H01Q 21/062; H01Q 3/00
USPC .................................................. 342/107, 368
See application file for complete search history.

(56) References Cited

U.S. PATENT DOCUMENTS 5,959,570 A *   9/1999   Russell .......................... 342/70
2003/0142011 A1   7/2003   Abramovich et al.
(Continued)

FOREIGN PATENT DOCUMENTS

EP           1932212 B1    3/2010
GB           2150763 A     7/1985
WO    WO 2007/057476 A1   5/2007

OTHER PUBLICATIONS

European Patent Office, Extended European Search Report for Application No. 10861112.0, Apr. 29, 2015, 6 pages, Germany.
(Continued)

*Primary Examiner* — Timothy A Brainard
(74) *Attorney, Agent, or Firm* — Alston & Bird LLP

(57) ABSTRACT

The invention provides an antenna arrangement for a radar system arranged for coverage of a surveillance area and comprising antenna elements. The antenna elements are arranged to receive a signal transmitted from a transmit antenna of a transmit antenna arrangement and reflected by a target towards the antenna arrangement wherein: • the antenna arrangement comprises at least two non-parallel line arrays, • each antenna element being connected to a receiver where each line array is arranged to create, by using digital beam forming, beams for instantaneous coverage of at least said surveillance area and • within the surveillance area said line arrays are arranged to allow the target position to be limited to one or two crossing areas between at least two beams from different line arrays from which target reflections have been received. The invention also provides a corresponding method and a radar system comprising the antenna arrangement.

19 Claims, 9 Drawing Sheets

(51) Int. Cl.
*G01S 13/48* (2006.01)
*H01Q 21/06* (2006.01)

(56) References Cited

U.S. PATENT DOCUMENTS

| 2007/0013575 A1* | 1/2007 | Lee et al. ......................... 342/52 |
| 2007/0159922 A1 | 7/2007 | Zimmerman et al. |
| 2010/0141527 A1* | 6/2010 | Lalezari ................. H01Q 21/24 342/368 |
| 2012/0306684 A1* | 12/2012 | Shoji ............................. 342/107 |

OTHER PUBLICATIONS

International Searching Authority, International Search Report and Written Opinion for International Application No. PCT/SE2010/051462, mailed Aug. 18, 2011, 9 pages, The Swedish Patent and Registration Office, Sweden.

* cited by examiner

ANTENNA ARRANGEMENT FOR A RADAR SYSTEM

CROSS REFERENCE TO RELATED APPLICATIONS

This application is a national stage application, filed under 35 U.S.C. §371, of International Application Ser. No. PCT/SE2010/051462, filed Dec. 22, 2010, the contents of which is hereby incorporated by reference in its entirety.

BACKGROUND OF VARIOUS EMBODIMENTS

Related Field

The present invention relates to the field of antenna arrangements to be used in applications such as radar.

Description of Related Art

Modern radar systems often use digital beam forming, which means that several beams are created through signal processing in order to be able to search a certain volume in space faster and to instantaneously cover a wide area. To fully use this principle each antenna element must be connected to a receiver. The digitalized return signals are combined to beams using different time shifts to control the direction of each beam.

For a given angular resolution (in this prior art solution; the same in elevation- and azimuth-direction) at least n antenna elements are needed in each direction to create sufficiently narrow beams. This results in $n^2$ antenna elements in the array and the same number of receivers. For a given coverage sector (the same in elevation- and azimuth-direction) m beam directions are needed in both azimuth and elevation direction. This means that $m^2$ beams must be calculated simultaneously to cover every combination of azimuth and elevation directions.

FIG. 1a illustrates schematically a coverage sector 101 divided in m beams 102, each beam has a beam width 103 and a beam centre direction 104a. The coverage sector has a sector centre direction 104b dividing the coverage sector in two parts of substantially equal width. As the coverage sectors and angular resolution is the same in both azimuth and elevation in this case, FIG. 1a is illustrating the situation in both azimuth and elevation. The coverage sector comprises at least one beam, i.e. m≥1.

FIG. 1b illustrates the prior art solution described above with an antenna arrangement in the form of a digital 2D array 105 of antenna elements 106. One receiver 107 is connected to each antenna element. The receivers are connected to a digital beamformer 108. The digital beamformer is combining the received information into a number of beams 1 . . . k, 109.

The capacity needed in the digital beamformer is roughly proportional to the number of input data (receivers) times the number of output data (beams). The number of receivers in combination with the extreme computational demands makes fully digital antennas too expensive for most applications.

After the digital beamformer each beam must be handled separately to find targets. Due to cost and physical limitations radar systems often use digital beamforming in only one direction (elevation) and cover the other direction by for example rotating the antenna. This solution has the drawback of not being able to instantaneously cover a certain area, since it is limited by the rotation speed of the antenna arrangement. The instantaneous coverage is limited to the width in azimuth of each beam, this width typically being around just a few degrees. With a wide coverage area we henceforth mean a coverage sector in both elevation and azimuth being at least 5 degrees on each side of the sector centre direction in azimuth and elevation, but typically at least some ten, twenty or thirty degrees on each side of the sector centre direction. The planes do not necessarily have to be the azimuth and elevation planes but can be any two, perpendicular planes in space.

There is thus a need to achieve a less complicated signal processing with an instantaneous coverage of a wide coverage area.

BRIEF SUMMARY

The object of the invention is to reduce at least some of the mentioned deficiencies with the prior art solutions and to provide:
   an antenna arrangement for a radar system
   a method for calculating the position of targets to be within one or two crossing areas
to solve the problem to achieve a less complicated signal processing with an instantaneous coverage of a wide coverage area.

The object is achieved by providing an antenna arrangement for a radar system arranged for coverage of a surveillance area and comprising antenna elements. The antenna elements are arranged to receive a signal transmitted from a transmit antenna of a transmit antenna arrangement and reflected by a target towards the antenna arrangement wherein:
   the antenna arrangement comprises at least two non-parallel line arrays, each line array extending along a line array axis and comprising at least two antenna elements, each antenna element being connected to a receiver where each line array is arranged to create, by using digital beam forming, a number of adjacent and partly overlapping beams for instantaneous coverage of at least said surveillance area and,
   within the surveillance area said line arrays are arranged such that there is always free line of sight from at least two line arrays to the target, thus allowing the target position to be limited to one or two crossing areas between at least two beams from different line arrays from which target reflections have been received.

The object is further achieved by a method for calculating the position of targets to be within one or two crossing areas wherein positions can be calculated for targets within a surveillance area by using a radar system with an antenna arrangement according to anyone of claims 1-16. The method comprises a:
   digitalization step where the received signal from each antenna element in each line array is converted to digital form,
   digital beam forming step where a number of adjacent and partly overlapping beams in different directions are created from each line array for instantaneous coverage of at least said surveillance area by combining the digitized information from each antenna element in each line array with different time shifts,
   target identification step where targets are identified for each beam by their speed and distance relative to the antenna arrangement of the radar system,
   target data combination step using distance and speed to identify all beams in which each target is visible and
   target position calculation step where the position of each target is calculated to be within one or two crossing areas in space between beams from different line arrays.

A further advantage of the invention is that it also provides a radar system comprising an antenna arrangement according to any one of claims 1-16.

Additional advantages are achieved by implementing one or several of the features of the dependent claims not mentioned above, as will be explained below.

DETAILED DESCRIPTION OF VARIOUS EMBODIMENTS

The invention will now be described with reference to the enclosed drawings, FIG. 2-FIG. 10.

Figure 1A:
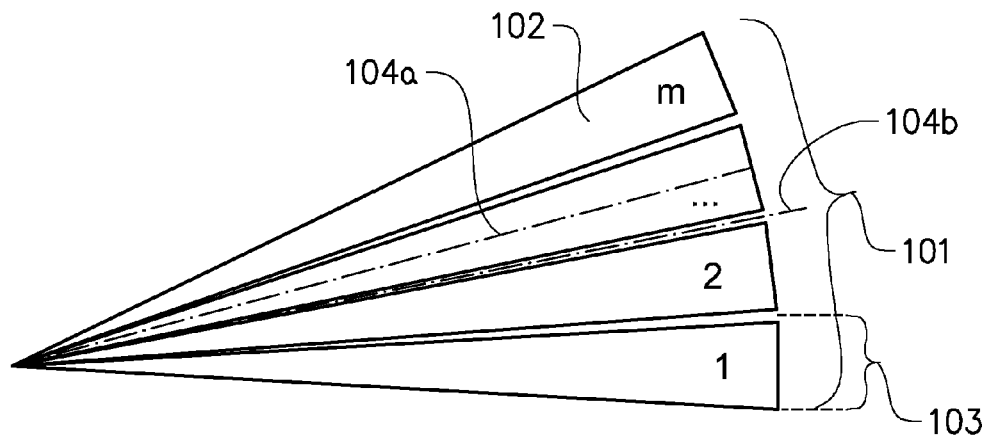
FIG. 1a schematically illustrates the terms coverage sector, beams and centre directions.

FIG. 1 has already been described in the Background part above.

The dimensions in drawings are not to scale and relations in dimensions between parts in the drawings have been chosen such as to primarily achieve clarity.

Figure 1B:
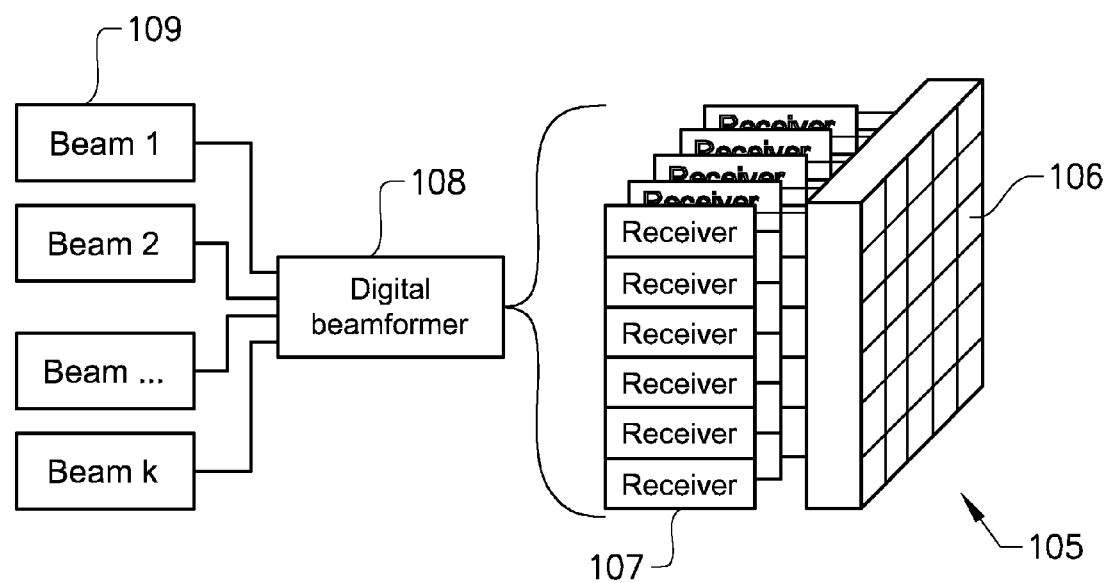
FIG. 1b schematically shows a digital 2D array according to prior art.
Figure 2:
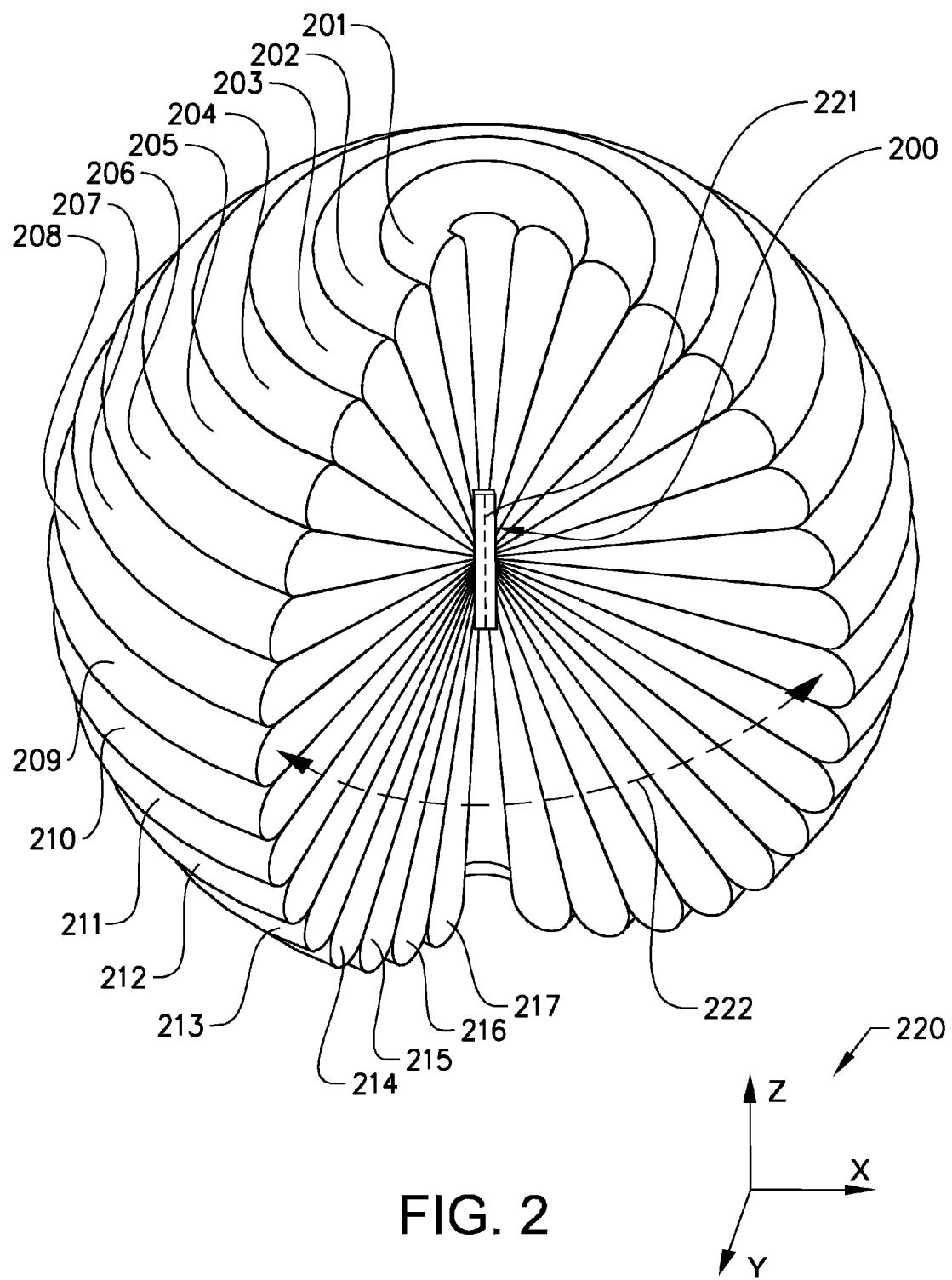
FIG. 2 schematically shows an example of a perspective view of beams from one line array.

FIG. 2 schematically shows a perspective view of beams from an elongated line array 200 according to the invention, the elongated line array having a longitudinal extension along a line array axis. The line array comprises at least two antenna elements 221. In this example of the invention the line array creates 17 beams 201-217 through digital beam forming. The number of beams can vary depending on the application and desired design parameters such as beam width. Typically the number of beams can be 4-64 but the scope and principle of the invention is not limited by the number of beams or number of antenna elements in the line array. The number of beams can for certain applications be expected to increase, even above or much above 64 beams, in line with future developments of e.g. computational power. The number of antenna elements is typically 8-64 but the number of antenna elements can also be expected to increase for certain applications, even above or much above 64 antenna elements, in line with future developments of e.g. computational power. For many applications it will however be sufficient to use a number of beams and antenna elements within the indicated ranges. As the computational power is proportional to the number of beams, the required computational power for a solution according to the invention will be much less than for a prior art solution according to FIG. 1b. The prior art solution will require $k^2$ beams while a two line array solution according to the invention will only require 2 k beams. This will be further exemplified.

A coordinate symbol 220 defines the x-, y- and z-axes. The antenna elements are located along the longitudinal direction of the line array. The line array axis is, in the example of FIG. 2, extending in the direction of the z-axis. Each antenna element 221 is connected to a receiver. The line array is arranged to create a number of adjacent and partly overlapping beams using digital beam forming. In FIG. 2 the beams are not shown as overlapping for clarity reasons. Each beam is approximately cone shaped except for a blind sector 222. When the antenna elements are omnidirectional or substantially omnidirectional the blind sector will be reduced to zero. Preferably substantially omnidirectional elongated dipoles are used as antenna elements with a longitudinal extension in the direction of the axis of the line array. The beams of FIG. 2 and other reception beam patterns in this description and claims illustrate the relative sensitivity as a function of direction of the digitally created beam.

Figure 3A:
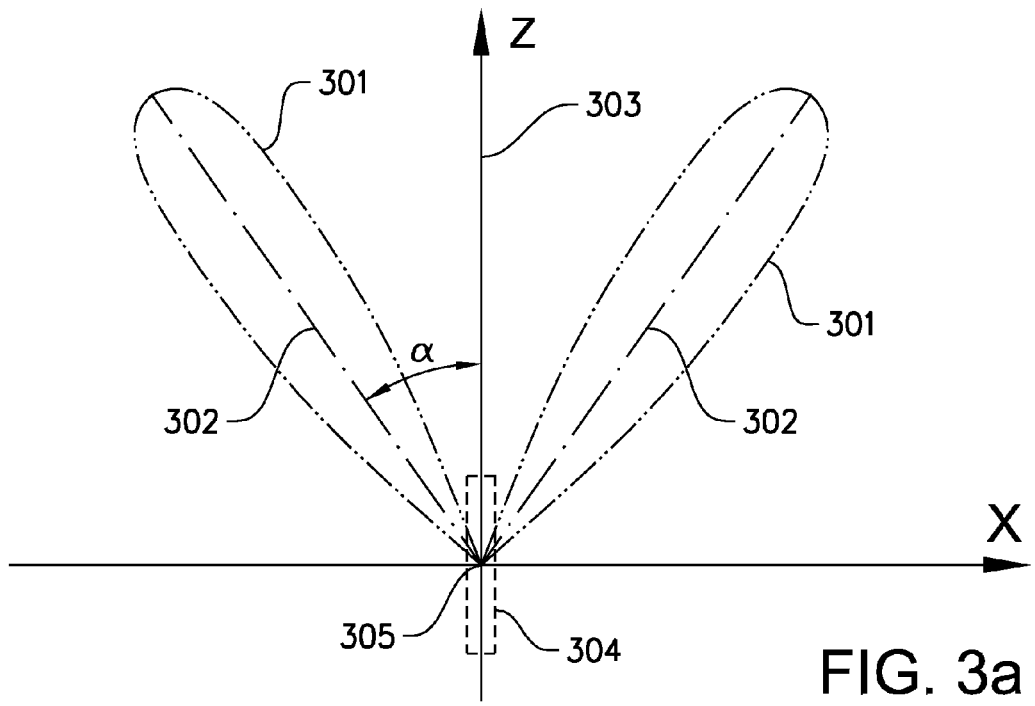
FIG. 3a schematically shows an example of a cross section in an x/z-plane of a beam.

FIG. 3a shows a cross section of one beam 301 in an x/z plan, the beam being created by digital beamforming. The beam could be one of several beams created by digital beamforming in a line array similar to the one shown in FIG. 2 and thus with a similar pattern of beams. Each of the digitally formed beams is extending along at least a part of a lateral surface 302 of a cone, the part defining a width, in this example in azimuth, of the beam with the y-axis being the sector centre direction, see FIG. 3b. The lateral surface has a surface angle α towards a cone axis 303, in this case coinciding with the z-axis, the surface angle defining a beam direction, in this example in elevation. The cone axis coincides with the axis of the line array 304. A cone apex 305 is located at the line array. The cone axis, about which the lateral surface has rotational symmetry, passes through the cone apex, the cone apex thus dividing the cone axis in two parts. The surface angle can assume values within the range 0-180 degrees, i.e. for cones below the x-axis of FIG. 3a the surface angle will be in the range 90-180 degrees and for cones above the x-axis in the range 0-90 degrees. This means that the surface angle will always start from the same part of the cone axis.

Figure 3B:
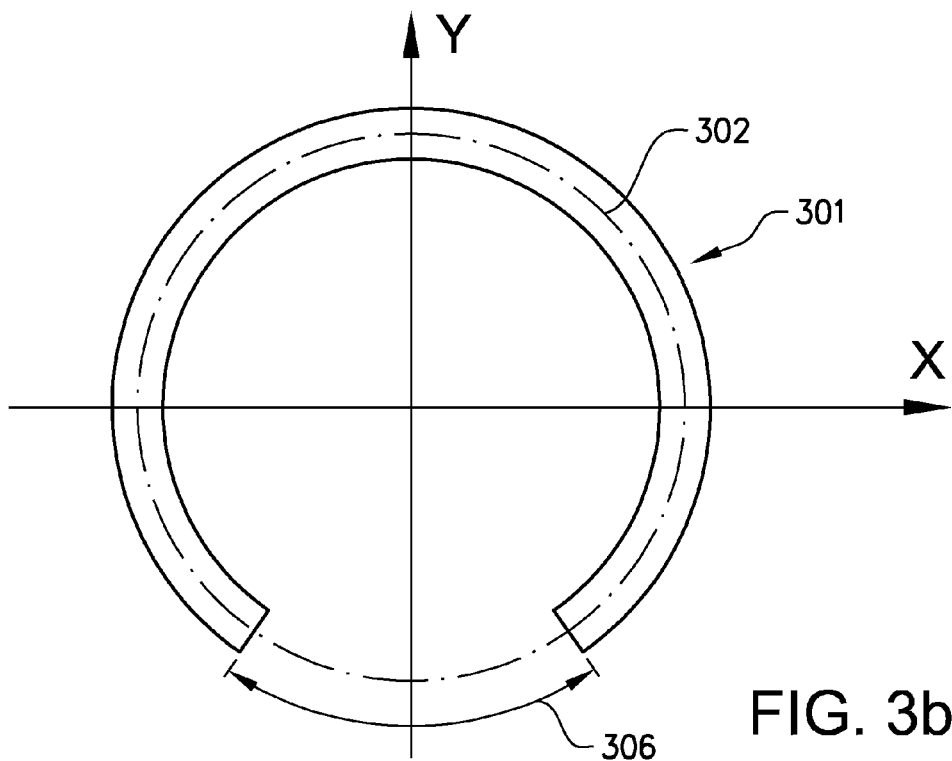
FIG. 3b schematically shows an example of a cross section in an x/y-plane of a beam.

FIG. 3b is a cross section of the beam 301 in an x/y plane showing the lateral surface 302 as a dash dotted line. In this example the beam is extending along the lateral surface 302 of the cone except for the part of the lateral surface corresponding to the blind sector 306. When substantially omnidirectional antenna elements, such as dipoles, are used, the blind sector will be reduced to zero and the beams are extending along the complete lateral surface of the cone. In this example the antenna elements are used to cover the azimuth plane and digital beamforming is used in an elevation plane being perpendicular to the azimuth plane. However other combinations of planes are also possible using e.g. the substantially omnidirectional coverage, or at least a wide coverage area, of the antenna elements in an elevation plane and digital beamforming in an azimuth plane. The planes do not necessarily have to be the azimuth and elevation planes but can be any two, perpendicular planes in space.

The sensitivity patterns of the antenna elements are in one example of the invention made substantially omnidirectional by e.g. using dipole elements. In other applications the antenna elements can be patches. Omnidirectional sensitivity for the antenna elements means that the antenna element has the same sensitivity in all directions for receiving electromagnetic radiation. With omnidirectional radiation is meant that the antenna element radiates electromagnetic energy equally in all directions when operating in transmit mode. An isotropic radiator is a theoretical point source which has a truly omnidirectional sensitivity and radiation. There are however no real antenna elements having a truly omnidirectional sensitivity or radiation. When the term substantially omnidirectional sensitivity or omnidirectional radiation is used in this description and claims, it means the sensitivity or radiation from an antenna element as a dipole, or other antenna element with a corresponding sensitivity or radiation, having an almost, or substantially, omnidirectional sensitivity or radiation. The sensitivity and radiation for a dipole is well known to the skilled person. In further applications of the invention one or several antenna elements in a line array can comprise one or several sub antenna elements coupled together and providing one analogue output signal from each of said antenna element. Thus, the antenna elements in a line array do not necessarily have to be of the same type but can be a mixture of e.g. dipoles and patches.

The invention comprises an antenna arrangement for a radar system arranged for coverage of a surveillance area and comprising antenna elements. The antenna elements are arranged to receive a signal transmitted from a transmit antenna of a transmit antenna arrangement and reflected by a target towards the antenna arrangement.

The antenna arrangement comprises at least two non-parallel line arrays. Each line array extends along a line array axis and comprises at least two antenna elements, and each antenna element is connected to a receiver where each line array is arranged to create a number of adjacent and partly overlapping beams using digital beam forming for instantaneous coverage of at least said surveillance area. Parallel line arrays are line arrays having their line array axes in parallel. Normally all beams have different beam directions, this is however not a necessary requirement.

The antenna arrangement for the radar system is covering a volume in space called the surveillance area. Within the surveillance area said line arrays are arranged such that there is always free line of sight from at least two line arrays to the target. As will be explained this will allow the target position to be limited to one or two crossing areas between at least two beams from different line arrays from which target reflections have been received.

The transmit antenna arrangement is arranged to create a wide transmitting beam covering the complete surveillance area. If a very wide surveillance area is required the transmit antenna of the transmit antenna arrangement can be a separate wide angle antenna such as a separate simple dipole type of antenna. In other application more narrow beam antenna, as e.g. horn antennas can be used.

In other examples of the invention the antenna elements in the line arrays can be used for both transmitting and receiving. Each antenna element is then connected to a receiver and a transmitter.

A signal reflected from a target and received in a beam created by one line array with substantially omnidirectional antenna elements can be used to position the target in a direction defined by the surface angle α. The distance to the target can be calculated by the time difference between transmitted and received signal. The beam and the surface angle α together with the time difference between transmitted and received signal thus defines the position of the target to be located somewhere on a circle on the lateral surface 302 of the cone, see FIG. 3b, if the antenna elements are substantially omnidirectional. If the antenna elements are of other types or if the sensitivity of the antenna elements is limited by mechanical obstacles, there will be a blind sector, and the target position will be located to a remaining part of a circle, not including the blind sector, as illustrated in FIG. 3b.

Figure 4:
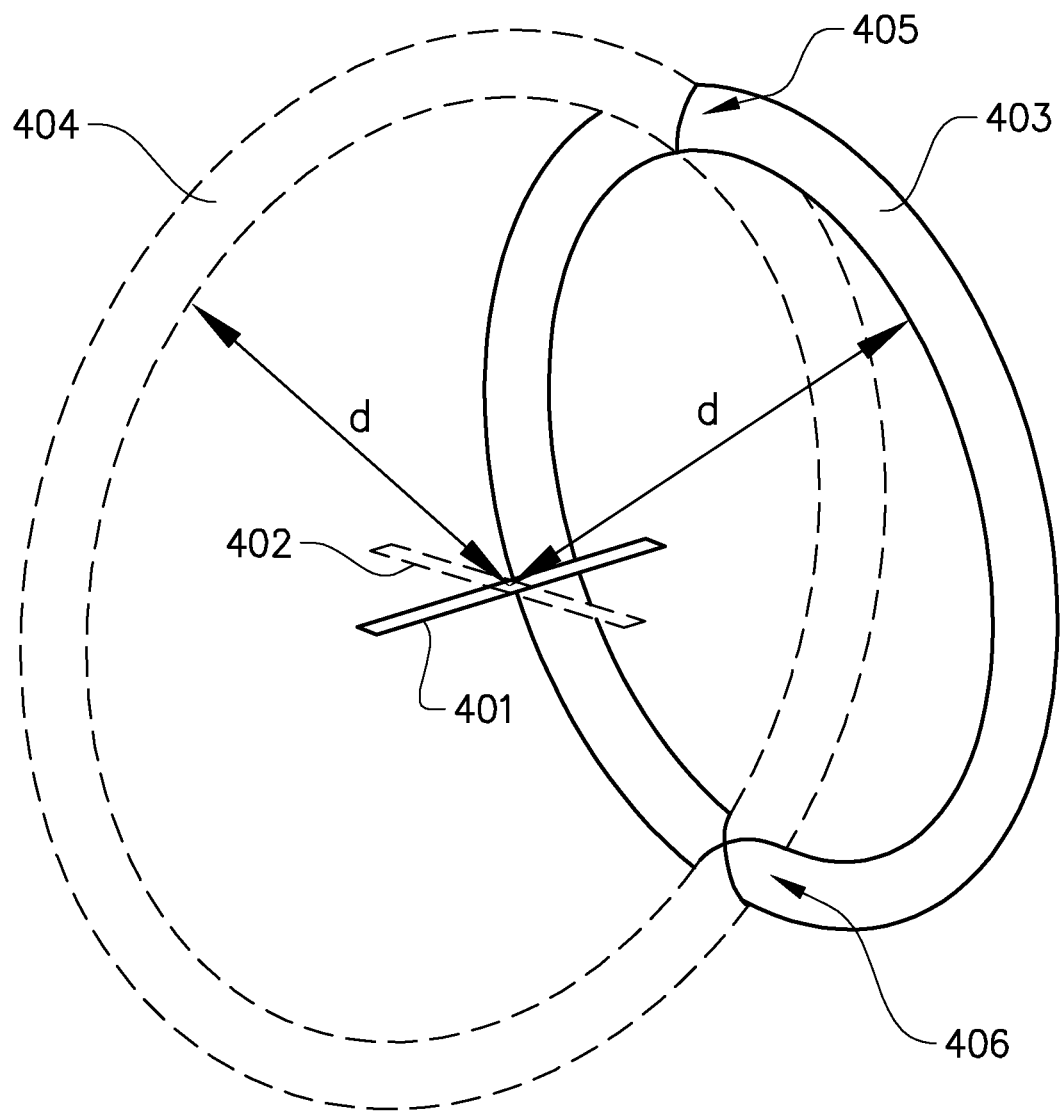
FIG. 4 schematically shows an example with two line arrays.

In order to further define the target position, a second line array of antenna elements are used as illustrated in FIG. 4 showing a first line array 401 and a second line array 402. The target is detected in a first beam created by the first line array 401 and in a second beam created by the second line array 402. As a distance d from the target to a line array can be calculated from the time difference between the signal being transmitted from the transmit antenna arrangement until the signal is received at the antenna elements after having been reflected from the target, the target position can be determined to be positioned somewhere on a first circle 403 on the first beam and somewhere on a second circle 404 on the second beam. Each point on the circles has a distance d to its line array. In this case all points on both circles have the same distance d to its line array, as the line arrays are co-located. In this example the transmit antenna arrangement is also co-located with the line arrays. The target position can then be determined to be positioned either within a first 405 or a second 406 crossing area between the two circles. As the circles in a practical realization will have a certain width the positions will be defined to a crossing area rather than a crossing point between the two circles. The accuracy of the position within the crossing area can be enhanced by combining information from adjacent beams and from several pulses transmitted from the transmit antenna arrangement and received by the antenna elements. The angel between the axes of the line arrays is in this example of the invention 90 degrees. However, also other angles between the axes of the line arrays can be used as will be shown, as long as targets within detection range is always within line of sight from at least two non parallel line arrays.

By combining two line arrays located on a panel being non-transparent for electromagnetic radiation, the antenna arrangement, including the two line arrays, will be looking only in front of the panel which means that an unambiguous target position can be determined. In this application two line arrays replace the 2D array of antenna elements as illustrated in the prior art solution of FIG. 1b. The fact that the positioning becomes unambiguous in this application of the invention can be understood from FIG. 4. In this case the antenna arrangement of the radar system is only looking in the direction above the cross of the first and second line arrays 401 and 402. This means that only the first crossing area 405 will be detected and the target can thus be determined to be within this area. FIG. 5 shows some possible configurations of line arrays that can be used in this application where two line arrays are located on a panel with their line array axes in an extension plane of the panel or in parallel with the extension plane of the panel.

Figure 5A:
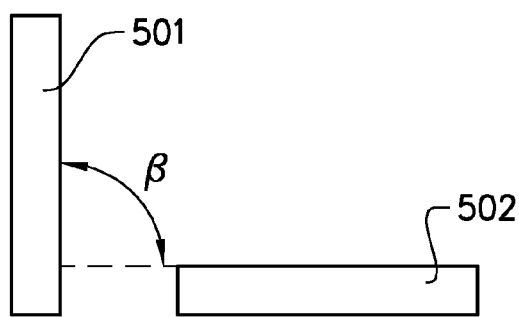
FIG. 5a-5c schematically shows different configurations of two line arrays mounted on a panel.
Figure 5B:
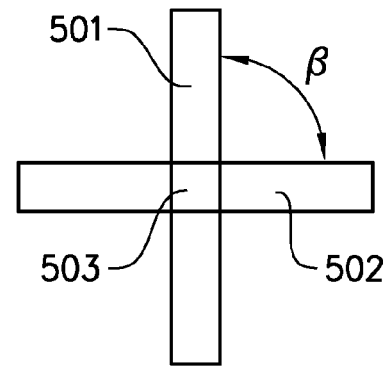
Figure 5C:
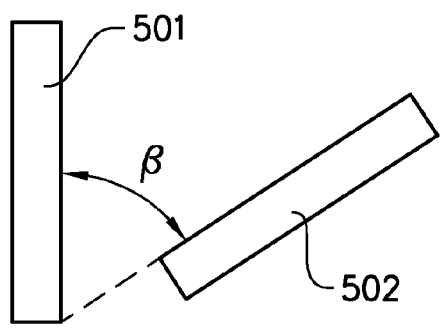

In FIG. 5a a first 501 and a second 502 line array are located at some distance with a right angle β between the axes of the line arrays. In FIG. 5b the two line arrays are crossing each other with their line array axes perpendicular to each other, β=90°, and with one antenna element 503 in common for both line arrays. FIG. 5c shows an example where the angle β between the axes is not equal to 90 degrees.

Figure 5D:
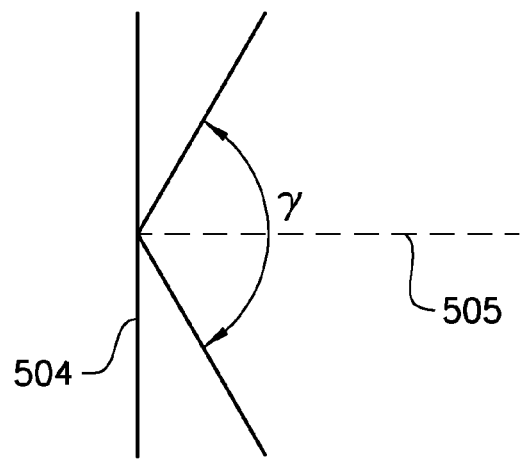
FIG. 5d schematically shows a coverage sector of a transmit antenna in one example of the invention.

FIG. 5d shows a top as well as a side view of the panel 504 where the line arrays are located, i.e. the coverage sectors are equal in two perpendicular planes. In this configuration a horn antenna is used in the transmit antenna arrangement. The horn antenna has in this example a coverage sector y in two perpendicular planes of approximately 120 degrees centred around an axis, or sector centre direction, 505 being perpendicular to the panel surface.

To cover a wide area such as a hemisphere each line array can be aligned along at least a part of a separate edge of a polyeder. In one example of the invention there are at least three line arrays where each line array is aligned along at least a part of a separate edge of the polyeder.

Figure 6:
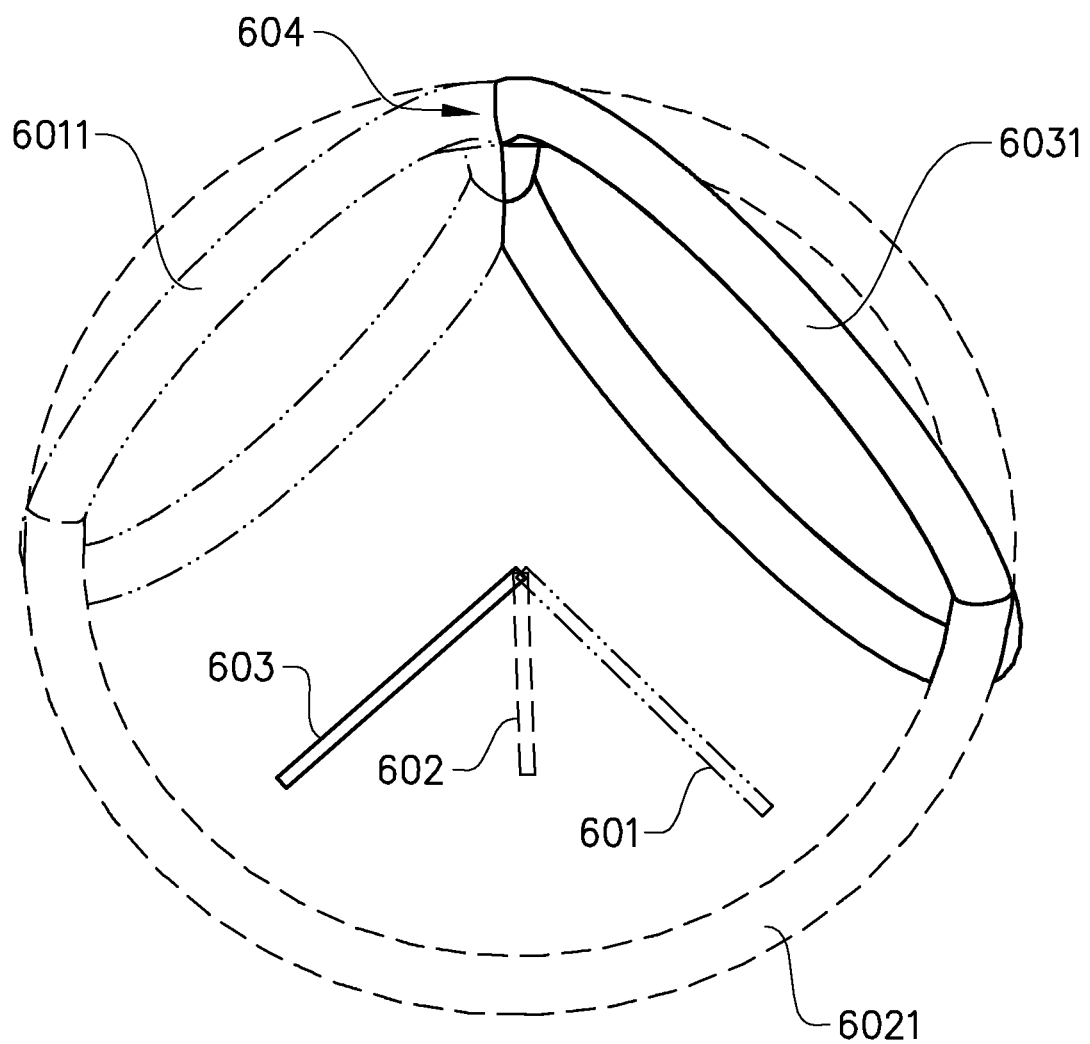
FIG. 6 schematically shows an example with three line arrays.

This is schematically illustrated in FIG. 6 with a first 601, a second 602 and a third 603 line array located in space as if they were located along edges of a tetraeder. In this case it is assumed that the antenna elements in each line array has substantially omnidirectional sensitivity and that there are no blind sectors caused for instance by a mechanical structure. This means that a target can be seen from all three line arrays and each line array is able to position the target on a circle. The first line array positions the target on a first circle 6011, the second line array positions the target on a second circle 6021 and the third line array positions the target on a third circle 6031. In this case the common crossing area 604 unambiguously defines the target position when there is a direct line of sight from each of the three line arrays to the target.

However as the surveillance area is defined as a volume in space from where there is always a free line of sight from at least two line arrays to the target it will always be possible to determine the target position to be within one of two crossing areas between beams. In the configuration of FIG. 6 it will always be possible to configure blind sectors and sensitivity patterns such that the target will be possible to see from at least two line arrays. In some applications as the one described above the third line array can also see the target and it can then be used to unambiguously determine the target positions. In other applications where the third line array cannot see the target it can be used to rule out one of the crossing areas between beams resulting in an unambiguous target position within one crossing area. The transmit antenna of the transmit antenna arrangement could in the application shown in FIG. 6 be a simple dipole antenna, providing substantially omnidirectional radiation. The dipole antenna can preferably be vertically oriented.

The information from the antenna arrangement can thus be used by the radar system to determine the position of a target unambiguously to be within one crossing area between beams in space or, in some applications as described, ambiguously to be within two possible crossing areas between beams in space. The target position can thus always be determined to be within one or two crossing areas between beams. In the latter case a final determination of target position will be made in a separate system using the information from the radar system and additional information to unambiguously determine the position of a target. Such additional information can be one or several of following types of information:
- terrain information (target is not likely to be inside a mountain),
- tactical information (enemy position could be roughly known),
- tracking over time e.g.: if raw data produces two possible tracks where one position in one of the tracks can be identified as false, e.g. because it is inside a mountain, then the track comprising this false position can be excluded and the position can unambiguously be defined to always be on the other track lacking the false position and
- data fusion (data from other sensors such as e.g. AEW (Airborne Early Warning) systems, thermal sensors or optical sensors).

Figure 7:
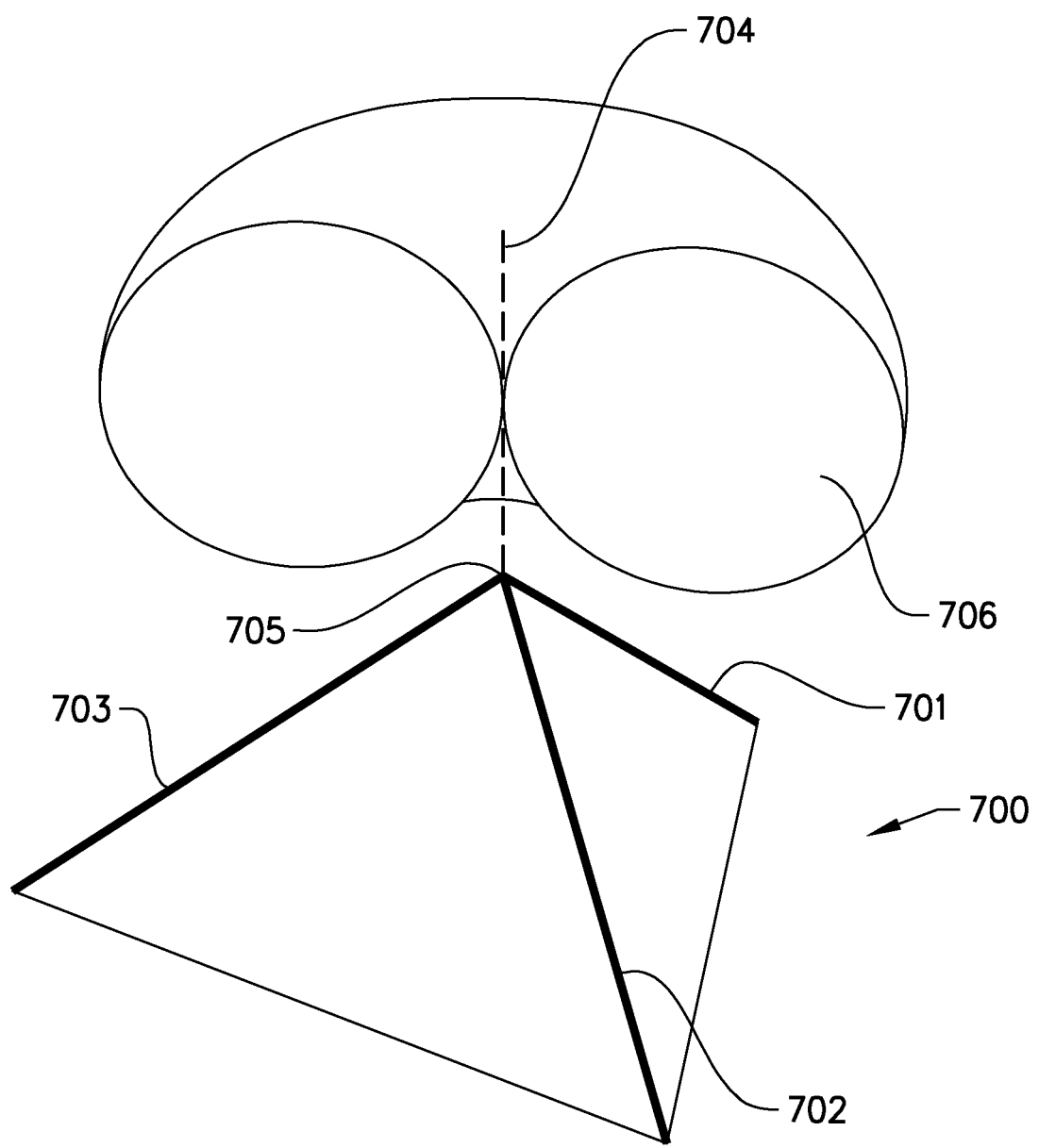
FIG. 7 schematically shows an example of the invention with three line arrays mounted along edges of a tetraeder and with a transmit antenna on top of the tetraeder.

FIG. 7 schematically illustrates a practical realization of the configuration of FIG. 6 with three line arrays where each line array is aligned along at least a part of a first 701, a second 702 and a third 703 edge of a tetraeder 700. The three edges with antenna elements meet at a top point 705. A transmit antenna 704 of the transmit antenna arrangement is located at the top of the tetraeder providing a substantially omnidirectional radiation pattern 706. The transmit antenna arrangement comprises the transmit antenna and a transmitter.

Figure 8:
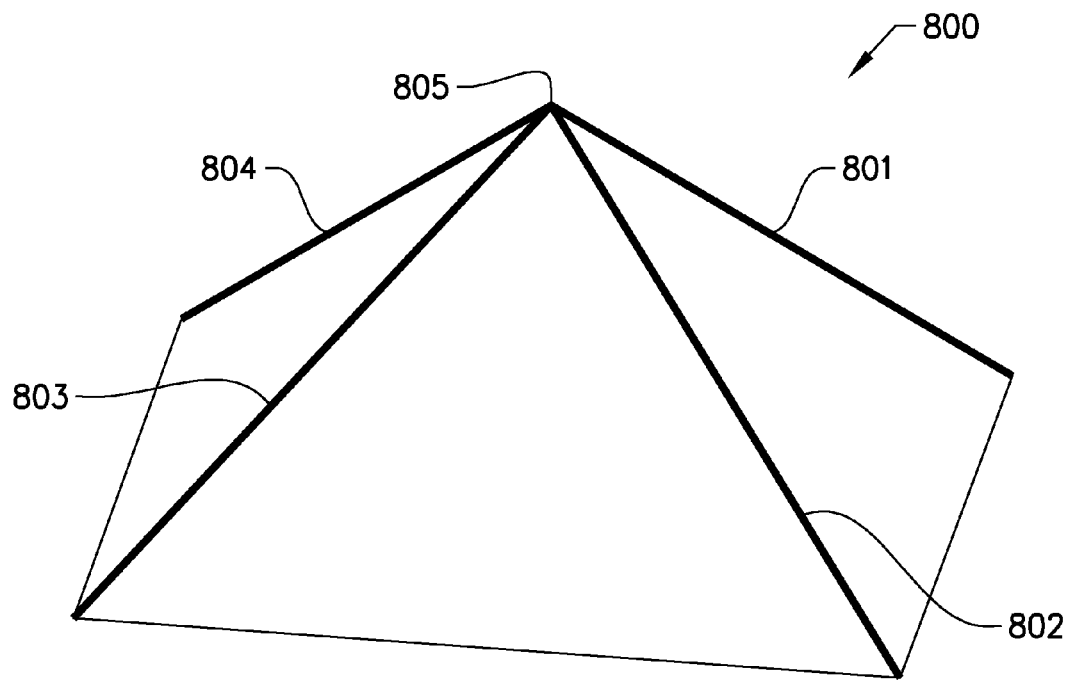
FIG. 8 schematically shows an example of the invention with four line arrays mounted along edges of a pyramid.

FIG. 8 schematically illustrates a further example of a realization of the invention with four line arrays where each line array is aligned along at least a part of a first 801, a second 802, a third 803 and a fourth 804 edge of a pyramid 800. Said edges with antenna elements are meeting at a top point 805. The transmit antenna can e.g. be located as in the example of FIG. 7.

The line arrays meeting at the top point, 705, 805, as described in FIGS. 7 and 8 can have a common antenna element located at the top point.

Figure 9:
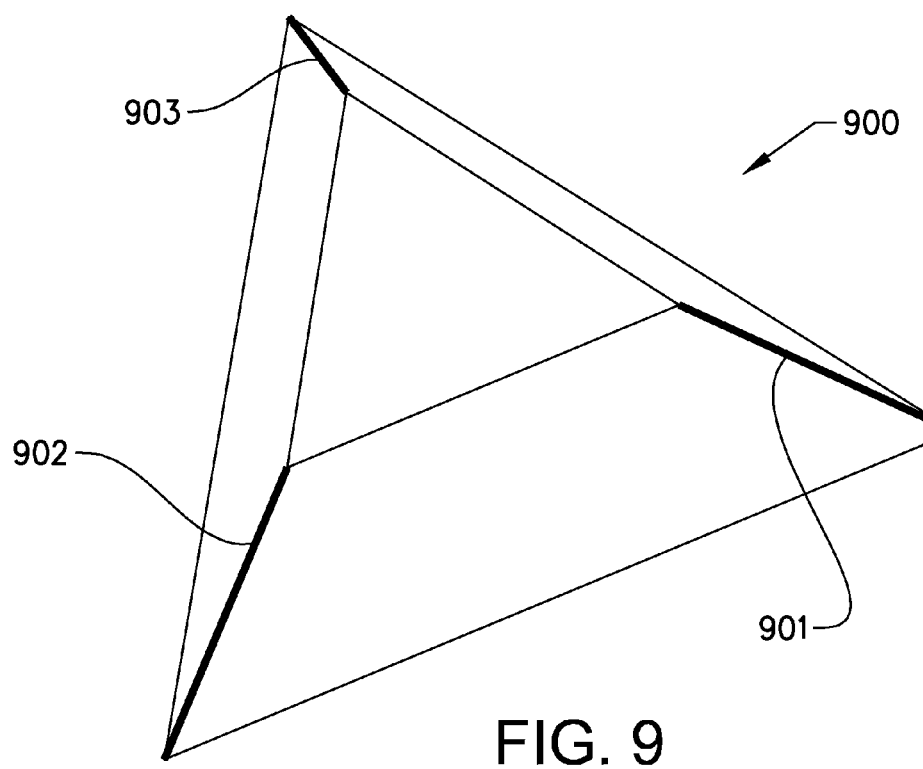
FIG. 9 schematically shows a configuration with the rows of antenna elements located along edges of a truncated tetraeder.
Figure 10:
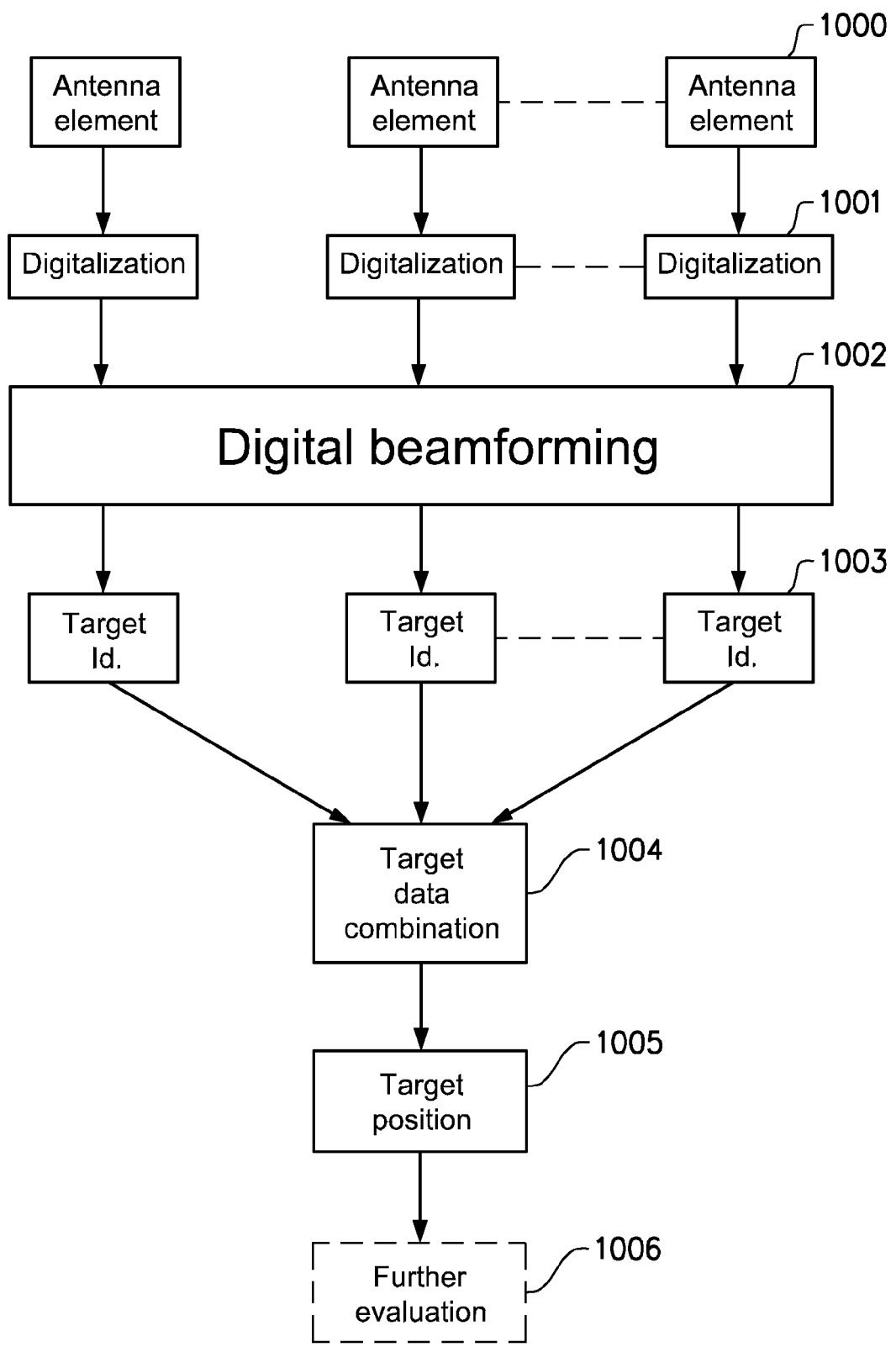
FIG. 10 shows a blockdiagram of one example of the method of the invention.

FIG. 9 schematically illustrates another example of a realization of the antenna arrangement with three line arrays located along three edges 901-903 on a truncated tetraeder 900. The transmit antenna can e.g. be located at a top point defined as the crossing point of extension lines from the three edges.

The invention provides, as described, an instantaneous coverage of a wide coverage area at a drastically reduced cost compared to a fully digital 2D array antenna. A wide coverage area, corresponding to the surveillance area, is as described earlier defined as a coverage sector in both elevation and azimuth being at least 5 degrees on each side of the sector centre direction in azimuth and elevation, but typically at least some ten, twenty or thirty degrees on each side of the sector centre direction. The planes do not necessarily have to be the azimuth and elevation planes but can be any two, perpendicular planes in space.

To give an example of the advantages of the invention an antenna requiring 24 antenna elements in a first line array and 24 antenna elements in a second line array and with 16 beamdirections in each line array requires the following compared to the prior art solution of FIG. 1b:

|  | Prior art | Invention |
|---|---|---|
| Antenna elements | $24^2 = 576$ | $2 \cdot 24 = 48$ |
| Receivers | 576 | 48 |
| Beams | $16^2 = 256$ | $2 \cdot 16 = 32$ |
| Range | 1 | $\left(\frac{24}{24^2}\right)^{1/4} \approx 0.45$ |

The example above shows that the inventive solution will require significantly less in terms of antenna elements, receivers and beams. These parameters directly influence size, weight, power consumption, cooling requirement and price of the radar system. The range reduction compared to prior art (assuming the same transmission power in the prior art and the inventive solution) means that the system is especially interesting for short range applications. The range calculation is made by comparing the receiving area of one line array of the inventive solution with the receiving area of the prior art solution and then calculating the fourth root of this relation according to the radar equation, well known to the skilled person. The range calculation has to be made by using only the area of one line array as each beam is created with information from only one line array.

The invention also provides a method to calculate the position of targets. The different steps of the method for one example of the invention are illustrated in a block diagram in FIG. 10. The steps do not necessarily have to be performed in the order described below and illustrated in FIG. 10.

In a digitalization step 1001 the received signal from each antenna element 1000 in each line array is converted to digital form.

In a digital beam forming step 1002 a number of adjacent and partly overlapping beams in different directions are created from each line array for instantaneous coverage of at least said surveillance area by combining the digitized information from each antenna element in each line array with different time shifts.

In a target identification step 1003 targets are identified for each beam by their speed and distance relative to the antenna arrangement of the radar system. The distance is calculated by the difference in time between transmitted and received signal in each beam and the speed of the target is calculated by the Doppler shift of the returned signal. These calculations are made by conventional means used in radar systems.

In a target data combination step 1004 range and speed is used to identify all beams in which each target is visible, i.e. beams from which target reflections have been received. A target can be detected from one or several adjacent beams from one line array. When the target is detected in more than one beam from one line array the beam with the strongest received signal is chosen for crossing area calculations and the information from adjacent beams is used for improving accuracy in defining target position as described in target position calculation step 1005 below.

In a target position calculation step 1005 the position of each target is calculated. If the target combination step 1004 has identified beams from only one line array the position will be a circle (or part of circle depending on known beam limitations). This alternative is however ruled out as the configuration of the antenna arrangement is such that there is always free line of sight from at least two line arrays to the target. The target will thus always be visible in two beams in two line arrays. When beams from two line arrays are available the position will then be within one or two crossing areas in space between beams from different line arrays (one crossing area if known beam limitations excludes one option) as explained in association with the example according to FIG. 4. When beams from three or more line arrays are available the position will be within a single crossing area in space between beams from different line arrays. As mentioned above the accuracy of the position within the crossing area can be enhanced by combining information from adjacent beams and from several pulses transmitted from the transmit antenna arrangement and received by the antenna elements.

The target positions will normally be further evaluated 1006 in order to, for example, track targets over time, combine information with other sensors to resolve possible ambiguities and calculate projectile trajectories. This separate system is not part of the invention. Additional information that can be used to resolve ambiguities include:
 terrain information
 tactical information,
 tracking over time and
 data fusion
as explained above.

In summary the invention provides a method for calculating the position of targets to be within one or two crossing areas wherein positions can be calculated for targets within a surveillance area by using a radar system with an antenna arrangement according to anyone of claims 1-16. The method comprising a:
 digitalization step 1001 where the received signal from each antenna element 1000 in each line array is converted to digital form,
 digital beam forming step 1002 where a number of adjacent and partly overlapping beams in different directions are created from each line array for instantaneous coverage of at least said surveillance area by combining the digitized information from each antenna element in each line array with different time shifts,
 target identification step 1003 where targets are identified for each beam by their speed and distance relative to the antenna arrangement of the radar system,
 target data combination step 1004 using distance and speed to identify all beams in which each target is visible and
 target position calculation step 1005 where the position of each target is calculated to be within one or two crossing areas in space between beams from different line arrays.

The invention also provides a radar system comprising an antenna arrangement according to any one of claims 1-16.

The invention is not limited to the embodiments and examples described above, but may vary freely within the scope of the appended claims.

The invention claimed is:

1. An antenna arrangement for a radar system arranged for coverage of a surveillance area and comprising antenna elements (106), the antenna elements being arranged to receive a signal transmitted from a transmit antenna of a transmit antenna arrangement and reflected by a target towards the antenna arrangement, wherein:
 the antenna arrangement comprises at least two non-parallel line arrays (200, 304, 401, 402, 501, 502, 601-603), each line array extending along a line array axis and comprising at least two antenna elements (221);
 each antenna element (221) being connected to a receiver where each line array is arranged to create, by using digital beam forming, a number of adjacent and partly overlapping beams (201-217, 301) for instantaneous coverage of at least said surveillance area;
 within the surveillance area said line arrays are arranged such that there is always free line of sight from at least two line arrays to the target, thus allowing the target position to be limited to one or two crossing areas (405, 406, 604) between at least two beams from different line arrays from which target reflections have been received; and
 each of the digitally formed beams (201-217, 301) extend along at least a part of a lateral surface (302) of a cone, the part of the lateral surface (302) defining a width of the beam and the lateral surface (302) having a surface angle ($\alpha$) towards a cone axis (303), the surface angle defining a beam direction, such that, with a cone apex (305) located at the line array (200, 304, 401, 402, 501, 502, 601-603), the cone axis, about which the lateral surface has rotational symmetry, passes through the cone apex.

2. An antenna arrangement according to claim 1, wherein the transmit antenna (704) of the transmit antenna arrangement is a separate wide angle antenna.

3. An antenna arrangement according to claim 2, wherein the transmit antenna (704) of the transmit antenna arrangement is a vertically oriented dipole antenna, providing substantially omnidirectional radiation.

4. An antenna arrangement according to claim 1, wherein the antenna elements (221) in the line arrays are used for both transmitting and receiving, each antenna element being connected to a receiver and a transmitter.

5. An antenna arrangement according to claim 1, wherein the antenna elements (221) are dipoles.

6. An antenna arrangement according to claim 1, wherein sensitivity patterns of the antenna elements (221) are substantially omnidirectional.

7. An antenna arrangement according to claim 1, wherein the antenna elements (221) are patches.

8. An antenna arrangement according to claim 1, wherein two line arrays (501, 502) are located on a panel (504) with their line array axes in an extension plane of the panel or in parallel with the extension plane of the panel.

9. An antenna arrangement according to claim 8, wherein the two line arrays (501, 502) are crossing each other with their line array axes perpendicular to each other and with one antenna element (503) in common for both line arrays.

10. An antenna arrangement according to claim 1, wherein each line array (200, 304, 401, 402, 501, 502, 601-603) is aligned along at least a part of a separate edge (701-703, 801-804, 901-903) of a polyhedron.

11. An antenna arrangement according to claim 10, wherein there are at least three line arrays (200, 304, 401, 402, 501, 502, 601-603), each line array being aligned along at least a part of a separate edge of the polyhedron.

12. An antenna arrangement according to claim 11, wherein there are three line arrays (200, 304, 401, 402, 501, 502, 601-603), each line array is aligned along at least a part of a first (701), a second (702) and a third (703) edge of a tetrahedron (700), the three edges with antenna elements meeting at a top point (705).

13. An antenna arrangement according to claim 12, wherein the line arrays (200, 304, 401, 402, 501, 502, 601-603) meeting at the top point have a common antenna element located at the top point (705, 805).

14. An antenna arrangement according to claim 10, wherein there are four line arrays (200, 304, 401, 402, 501, 502, 601-603), each line array being aligned along at least a part of a first (801), a second (802), a third (803) and a fourth (804) edge of a pyramid (800), said edges with antenna elements meeting at a top point (805).

15. An antenna arrangement according to claim 14, wherein the line arrays (200, 304, 401, 402, 501, 502, 601-603) meeting at the top point have a common antenna element located at the top point (705, 805).

16. An antenna arrangement according to claim 1, wherein one or several antenna elements in a line array comprise/s one or several sub antenna elements.

17. A method for calculating the position of targets to be within one or two crossing areas, wherein positions can be calculated for targets within a surveillance area by using a radar system with an antenna arrangement according to claim 1, the method comprising:
- a digitalization step (1001) where the received signal from each antenna element (1000) in each line array is converted to digital form;
- a digital beam forming step (1002) where a number of adjacent and partly overlapping beams in different directions are created from each line array for instantaneous coverage of at least said surveillance area by combining the digitized information from each antenna element in each line array with different time shifts;
- a target identification step (1003) where targets are identified for each beam by their speed and distance relative to the antenna arrangement of the radar system;
- a target data combination step (1004) using distance and speed to identify all beams in which each target is visible; and
- a target position calculation step (1005) where the position of each target is calculated to be within one or two crossing areas in space between beams from different line arrays.

18. A radar system comprising an antenna arrangement according to claim 1.

19. An antenna arrangement for a radar system arranged for coverage of a surveillance area and comprising antenna elements (106), the antenna elements being arranged to receive a signal transmitted from a transmit antenna of a transmit antenna arrangement and reflected by a target towards the antenna arrangement, wherein:
- the antenna arrangement comprises at least three line arrays (200, 304, 401, 402, 501, 502, 601-603), each line array being aligned along at least a part of a first (701), a second (702), and a third (703) edge of a tetrahedron (700) and comprising at least two antenna elements (221);
- each antenna element (221) being connected to a receiver where each line array is arranged to create, by using digital beam forming, a number of adjacent and partly overlapping beams (201-217, 301) for instantaneous coverage of at least said surveillance area; and
- within the surveillance area said line arrays are arranged such that there is always free line of sight from at least two line arrays to the target, thus allowing the target position to be limited to one or two crossing areas (405, 406, 604) between at least two beams from different line arrays from which target reflections have been received.

* * * * *